(12) United States Patent
Rock et al.

(10) Patent No.: US 6,723,967 B2
(45) Date of Patent: Apr. 20, 2004

(54) HEATING/WARMING TEXTILE ARTICLES WITH PHASE CHANGE COMPONENTS

(75) Inventors: Moshe Rock, Andover, MA (US); Vikram Sharma, Stoneham, MA (US)

(73) Assignee: Malden Mills Industries, Inc., Lawrence, MA (US)

( * ) Notice: Subject to any disclaimer, the term of this patent is extended or adjusted under 35 U.S.C. 154(b) by 202 days.

(21) Appl. No.: 09/974,371

(22) Filed: Oct. 10, 2001

(65) Prior Publication Data

US 2002/0086204 A1 Jul. 4, 2002

Related U.S. Application Data

(60) Provisional application No. 60/238,915, filed on Oct. 10, 2000.

(51) Int. Cl.[7] .................................................. H05B 3/34
(52) U.S. Cl. ..................................... 219/528; 428/308.4
(58) Field of Search .............................. 219/528, 217, 219/544, 212, 387, 529, 386, 530; 607/96, 98, 108; 428/308.4

(56) References Cited

U.S. PATENT DOCUMENTS

| | | |
|---|---|---|
| 1,439,094 A | 12/1922 | Gingras |
| 3,202,801 A | 8/1965 | Saluri |
| 3,476,102 A | 11/1969 | Sarnoff |
| 4,817,704 A | 4/1989 | Yamashita |
| 4,894,931 A | 1/1990 | Senee et al. |
| 5,302,806 A | 4/1994 | Simmons et al. |
| 5,329,096 A | 7/1994 | Suematsu |
| 5,486,680 A | 1/1996 | Lieberman |
| 5,750,962 A | 5/1998 | Hyatt |
| 6,031,212 A * | 2/2000 | Westerman et al. ......... 219/535 |
| 6,160,246 A * | 12/2000 | Rock et al. .................. 219/545 |
| 6,319,599 B1 * | 11/2001 | Buckley ..................... 428/308.4 |
| 6,329,644 B1 * | 12/2001 | Hyatt ......................... 219/528 |
| 6,501,055 B2 * | 12/2002 | Rock et al. .................. 219/545 |
| 6,548,789 B1 * | 4/2003 | Rock et al. .................. 219/545 |
| 6,582,456 B1 * | 6/2003 | Hand et al. ................. 607/108 |

FOREIGN PATENT DOCUMENTS

| | | |
|---|---|---|
| DE | 197 45 889 | 4/1999 |
| EP | 0 306 202 | 3/1898 |
| EP | 1 021 064 | 7/2001 |
| WO | WO 94 02257 | 2/1994 |

* cited by examiner

Primary Examiner—Joseph Pelham
Assistant Examiner—Vinod D. Patel
(74) Attorney, Agent, or Firm—Fish & Richardson P.C.

(57) ABSTRACT

A heating/warming textile article (11) with a fabric body (13) with electrical resistance heating/warming elements (15) also contains a phase change component (17) which releases and absorbs latent heat in a cycle corresponding to ON/OFF operation of a power source (23), e.g., a battery, thus to conserve and extend useful battery life.

13 Claims, 14 Drawing Sheets

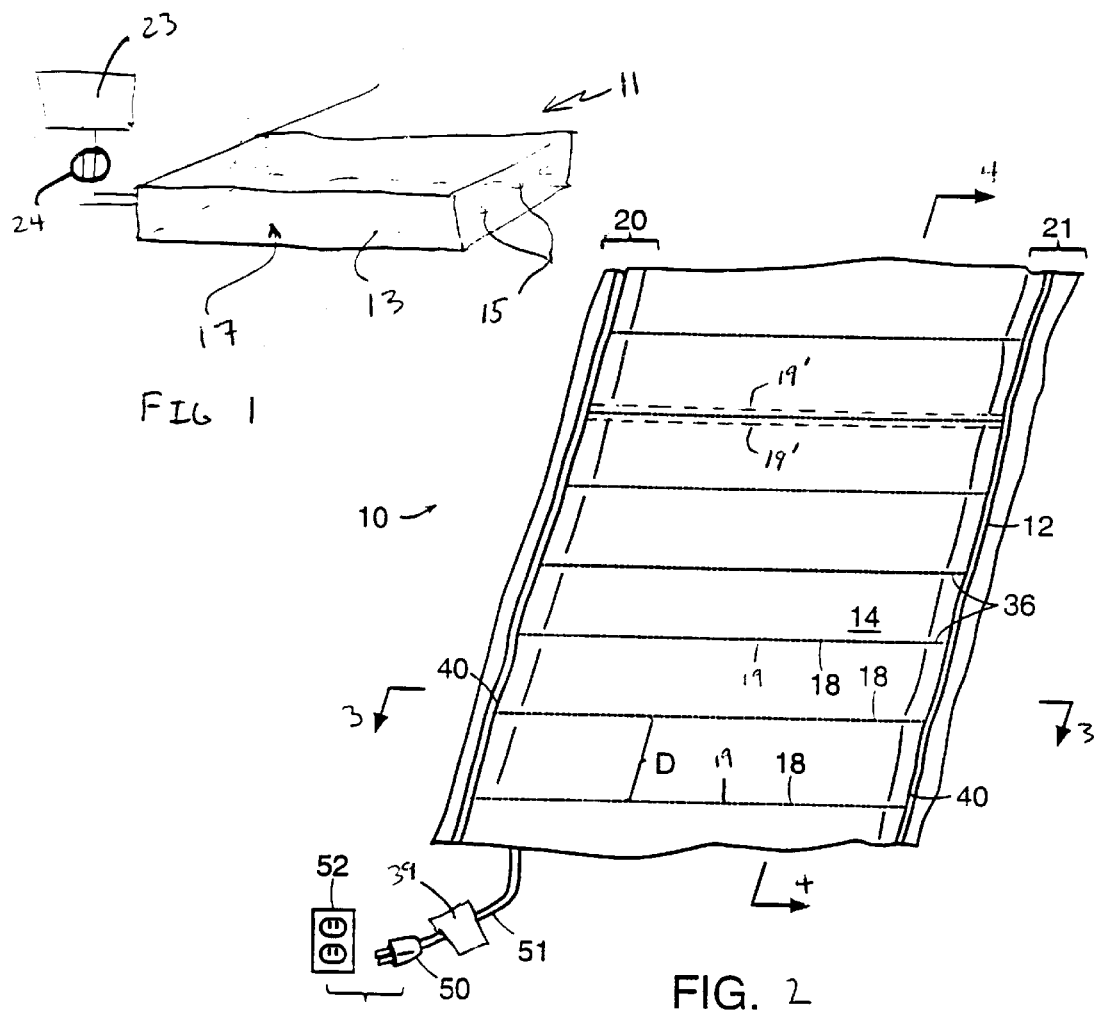
FIG. 1
FIG. 2
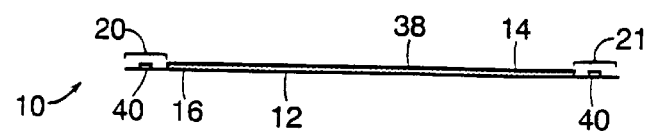
FIG. 3
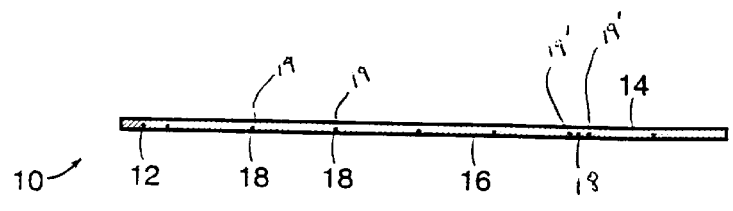
FIG. 4

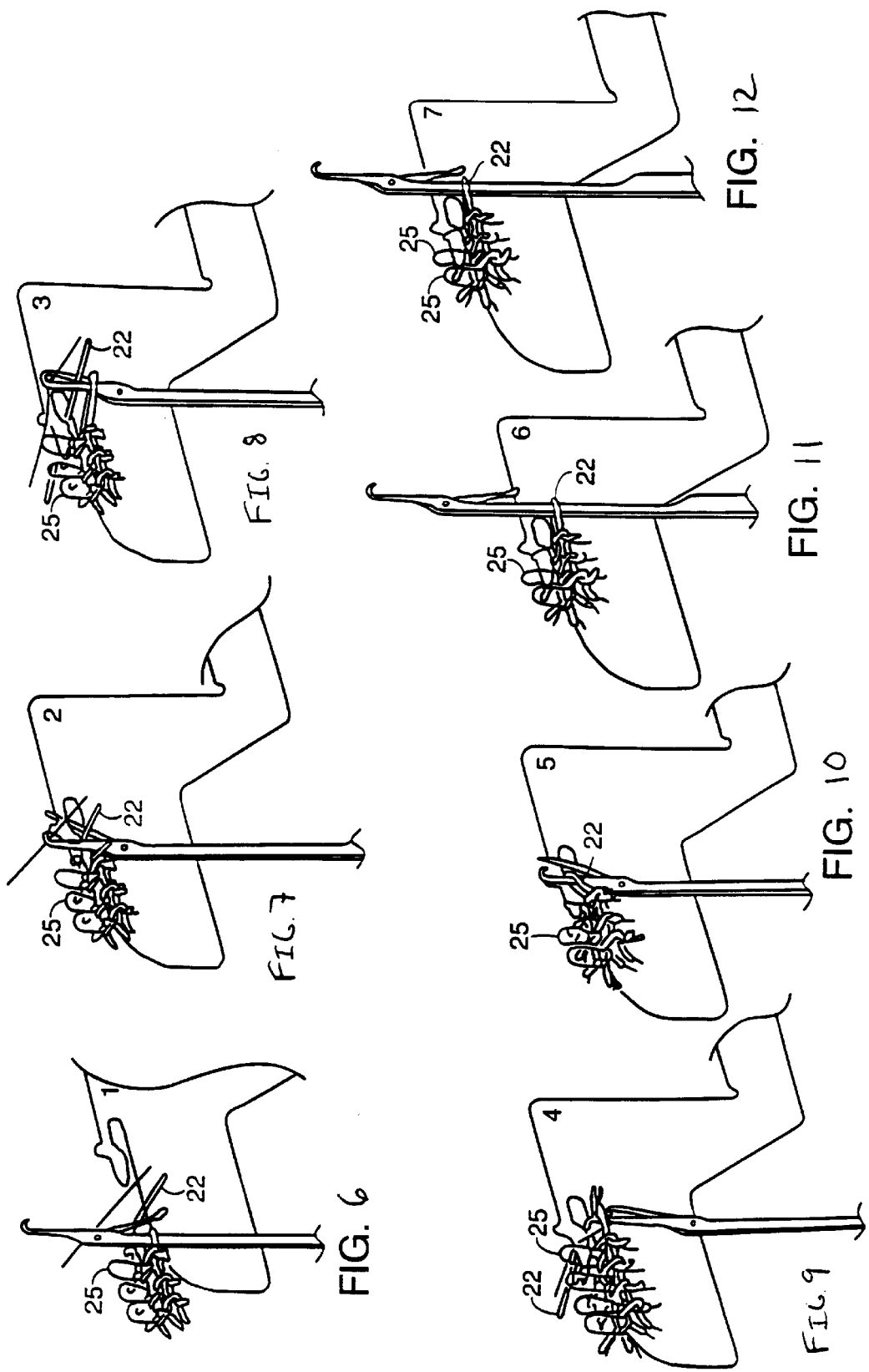

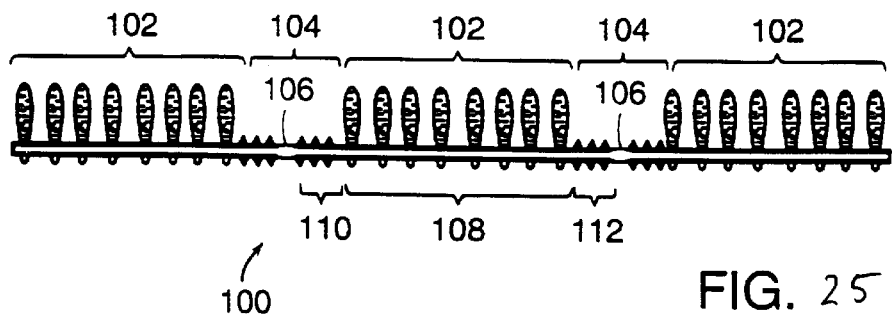
FIG. 25
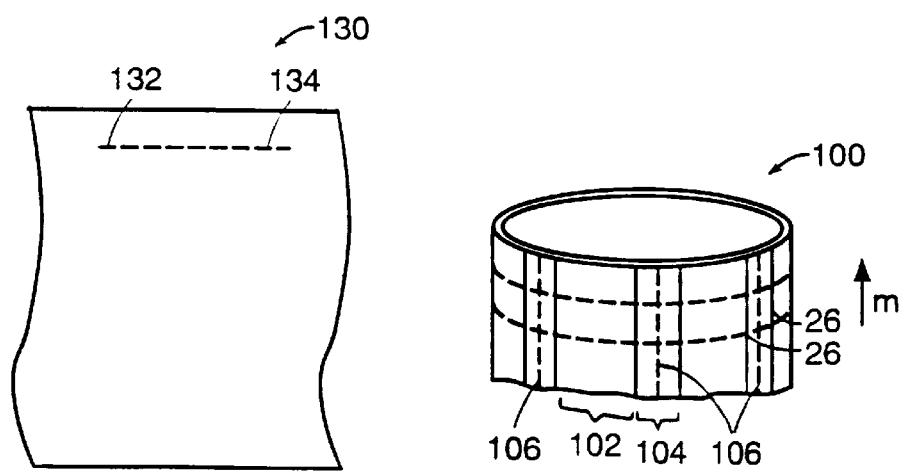
FIG. 29
FIG. 26
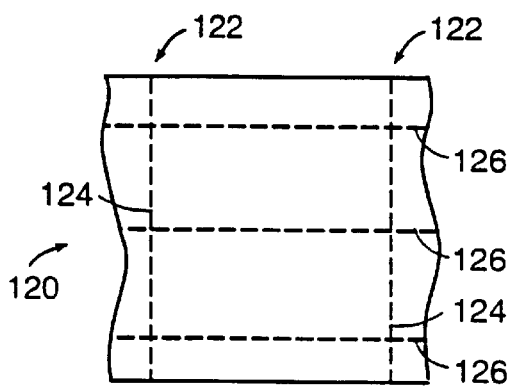
FIG. 27
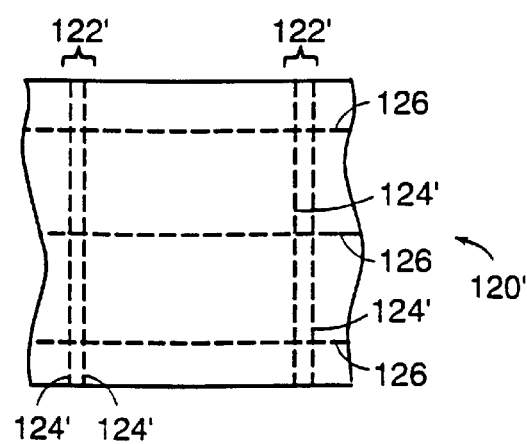
FIG. 28

HEATING/WARMING TEXTILE ARTICLES WITH PHASE CHANGE COMPONENTS

This application claims benefit from U.S. Provisional Application No. 60/238,915, filed Oct. 10, 2000, now abandoned.

TECHNICAL FIELD

This invention relates to textile articles with heating/warming, and more particularly to such heating/warming textile articles incorporating phase change components.

BACKGROUND

All common forms of chemical matter are found in one of three phases, i.e. solid, liquid, or gas, depending upon temperature and pressure conditions of the local environment. It is known that a change of phase requires either release of latent heat energy or requires addition of latent heat energy. More specifically, changing the phase of a material from solid to liquid or from liquid to gas (or, in the case of, e.g., carbon dioxide or "dry ice" directly from solid to gas) requires addition (application) of a predetermined amount of energy (heat), measured, e.g., in calories. Conversely, change of phase of a material from gas to liquid or from liquid to solid (or gas to solid) requires release or removal of energy (heat). Each change of phase for a particular material, or combination of materials, occurs under predetermined combinations of temperature and pressure.

Others have suggested employing phase change materials in thermal insulation. For example, Colvin et al. U.S. Pat. No. 5,804,297 describes a coating employing microencapsulated phase change material for the purpose of insulating a substrate against thermal transients or impulses.

SUMMARY

According to the invention, a heating/warming textile article consists of a fabric body with electrical resistance heating/warming elements that generate heating/warming upon application of electrical power, e.g., from a battery mounted to the fabric body, and the fabric body further includes a phase change component formulated to change phase in the temperature range of use of the textile article, to cyclically absorb and release latent heat, thus to conserve and extend the useful life of the battery.

According to one aspect of the invention, a heating/warming textile article includes a fabric body, an electrical resistance element attached to the fabric body, the electrical resistance element capable of being electrically coupled to and uncoupled from an electrical power source to cyclically provide electrical power to the electrical resistance element for providing heating/warming of the textile article, and a phase change component associated with the fabric body and including a phase change material formulated to change phase in a temperature range of use of the textile article, to cyclically absorb and release latent heat in a manner capable of conserving use of the electrical power source.

Variations of this aspect of the invention may include one or more of the following features. The phase change component includes a phase change fiber that microencapsulates the phase change material. The phase change fiber at least partially forms the fabric body. The phase change fiber is incorporated into the fabric body. The phase change fiber is attached to the fabric body by at least one of knitting, weaving, stitching, embroidery stitching, laminating and applying an adhesive. The phase change component includes a coating of phase change material on fibers the fabric body. The electrical resistance element includes a conductive yarn and the phase change component comprises a coating on the conductive yarn. The electrical resistance element includes a conductive yarn and the phase change fiber is stranded together with the conductive yarn. The temperature range of use of the textile article is about 32° F. to about 120° F. The phase change material includes at least one of paraffin and glycol. The power supply is a battery. The battery is mounted to the article. The heating/warming textile article includes a controller for controlling the electrical power supplied from the power supply to the electrical resistance elements. The controller includes a timer. The controller includes a thermostat.

In another aspect, the invention provides a method of conserving a useful life of a battery used to power a heating/warming textile article, the article including electrical resistance elements. The method includes associating a phase change component with the fabric body, the phase change component including a phase change material formulated to change phase in a temperature range of use of the textile article; applying power from the battery to the electrical resistance elements to raise the temperature of the heating/warming article and to cause the phase change material to change from a first phase to a second phase; electrically disconnecting the battery from the electrical resistance elements; and allowing the phase change material to change phase from the second phase to the first phase before applying additional power from the battery to the resistance elements.

According to another aspect of the invention, a heating/warming textile article consists of a fabric body with electrical resistance heating/warming elements that generate heating/warming upon application of electrical power, e.g., from a battery mounted to the fabric body, and the fabric body further includes a phase change component formulated to change phase in the temperature range of use of the textile article, to cyclically absorb and release latent heat, thus to conserve and extend the useful life of the battery.

The details of one or more embodiments of the invention are set forth in the accompanying drawings and the description below. Other features, objects, and advantages of the invention will be apparent from the description and drawings.

DESCRIPTION OF DRAWINGS

FIG. 1 is a somewhat diagrammatic perspective view of a first embodiment of a heating/warming textile article with a phase change component of the invention;

FIG. 2 is a perspective view of an electric heating/warming composite fibrous article with a phase change component of the invention in the form of an electric blanket;

FIG. 3 is an end section view of the electric heating/warming composite fibrous article of the invention, taken at the line 3—3 of FIG. 2;

FIG. 4 is a side section view of the electric heating/warming composite fibrous article of the invention, taken at the line 4—4 of FIG. 2;

FIGS. 6–12 are sequential views of a cylinder latch needle in a reverse plaiting circular knitting process, e.g. for use in forming an electric heating/warming composite fibrous article of the invention;

FIG. 13 is a somewhat diagrammatic end section view of a preferred embodiment of a conductive yarn for an electric heating/warming fibrous article with a phase change component of the invention, while

FIG. 25 is a somewhat diagrammatic sectional view of a segment of a tubular knit body knitted in a continuous web, to form multiple, alternating machine-direction panels or strips of regions with loops bounded by regions without loops; and FIG. 26 is a somewhat diagrammatic perspective view of the tubular knit body of FIG. 25;

FIGS. 27 and 28 are somewhat diagrammatic plan views of segments of woven electric heating/warming articles with a phase change component of another embodiment of the invention;

FIG. 29 is a somewhat diagrammatic plan view of a segment of a weft knit electric heating/warming article with a phase change component of another embodiment of the invention;

FIG. 34 is a somewhat diagrammatic front plan view of the first surface of the composite fabric article of FIG. 32, with an electric resistance heating/warming element formed thereupon, e.g., for a glove; while FIG. 34A is an enlarged view of the electric resistance heating/warming element showing the conductive yarn formed in embroidery stitching or sewing;

Like reference symbols in the various drawings indicate like elements.

DETAILED DESCRIPTION

Figure 5:
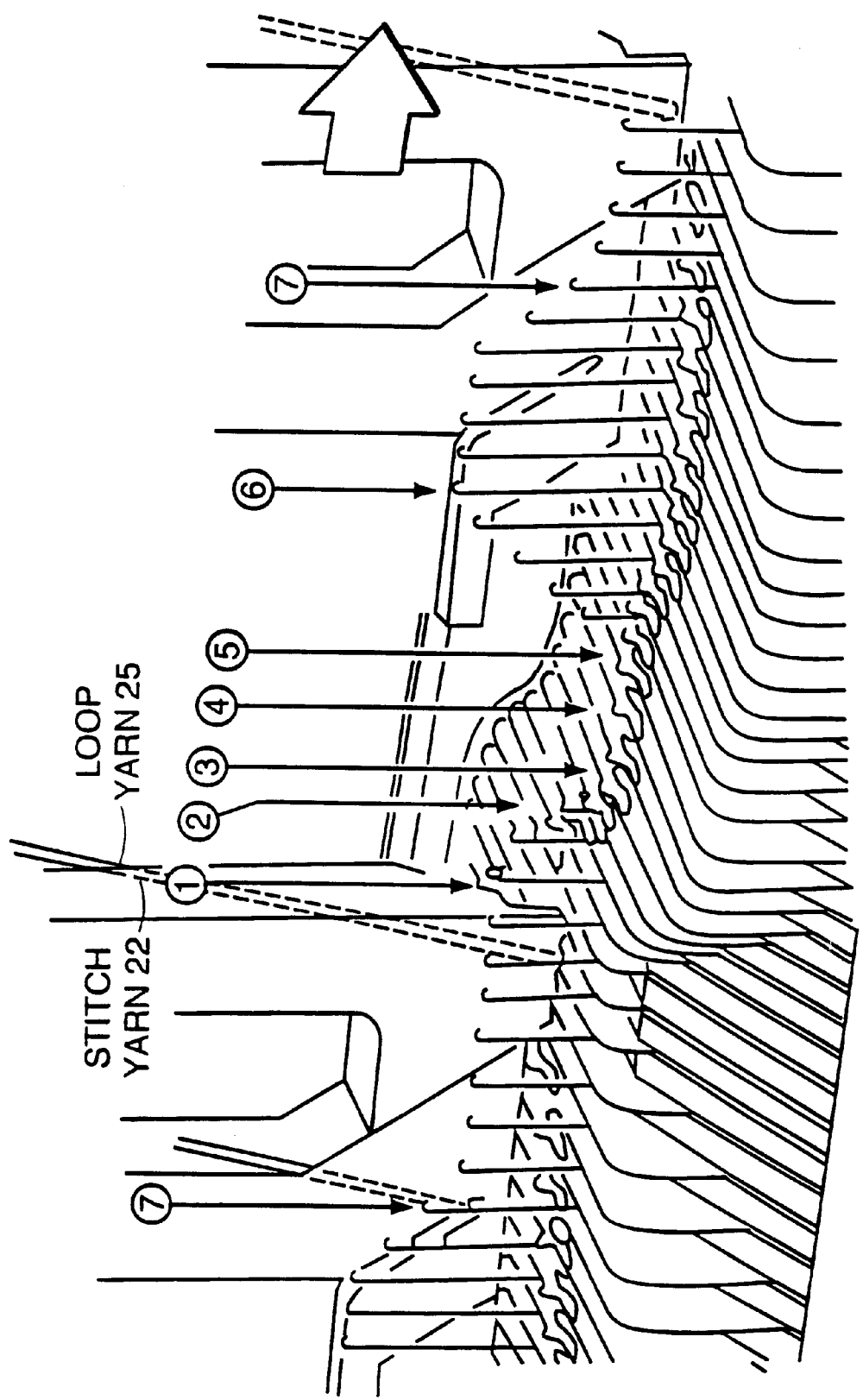
FIG. 5 is a perspective view of a segment of a circular knitting machine.

Textile heating/warming articles are known, e.g., in the form of electric blankets, heating and warming pads and mats, heated garments, and the like. Typically, these heating/warming articles consist of a fabric body containing electrical resistance heating wires or elements connected to a source of electrical power, such as an electrical outlet or a battery.

Referring to FIG. 1, according to the present invention, a textile heating/warming article 11 consists of a fabric body 13 containing electrical resistance heating elements 15 that generate heating/warming upon application of electrical energy, and the textile article also includes a phase change component (indicated generally at 17). The phase change component may be a phase change material incorporated into the fabric article or may be affixed thereupon in any suitable manner. For example, a suitable phase change material may be microencapsulated in fibers forming or incorporated into the fabric article and/or in fibers of conductive yarns, and/or in a coating or layer applied to the fibers and/or to the fabric article. Preferably, the phase change material is selected to absorb and release latent heat by changing phase within the temperature range typical for use, e.g. about 32° F. to about 120° F., of a personal textile heating/warming article 11, e.g., such as a heating blanket, a heating pad, an article of apparel, an article of home furnishings or the like. Suitable phase change materials may include, e.g., paraffin, glycol, and mixtures or blends of these or other materials, such as available commercially from Outlast, of Boulder, Colo. However, the exact temperature range at which the change of phase may occur can be tailored to different predetermined temperatures by selection of the precise formulation of the phase change material.

Fabric articles incorporating such a phase change component can take many forms. For example, referring still to FIG. 1, in one embodiment of the present invention, the electrical resistance heating elements 15 have the form of conductive yarns incorporated, e.g., knitted or woven, into the fabric body 13, as further discussed below.

Referring now to FIGS. 2–4, a fibrous electric heating/warming composite article 10 of the invention, e.g. an electric blanket, adapted to generate heat upon application of electrical power, consists of a fibrous body 12 having a technical back 14 and a technical face 16. The body 12 incorporates a plurality of spaced-apart electric resistance heating elements 18 extending between opposite edge regions 20, 21 of the body. Associated with body 12, is a phase change component 19, which in the illustrated embodiment, is incorporated into the electric resistance heating elements 18, as further described below with reference to FIGS. 13–17. Alternatively, the phase change material is microencapsulated in or forms a coating on fibers 19' that are not incorporated into heating elements 18, but are nonetheless attached to body 12, e.g., by being incorporated into body 12 in one of the body forming processes described below.

Referring also to FIGS. 5–12, in a preferred embodiment, the body 12 is formed by joining a stitch yarn 22 and a loop yarn 25 in a standard reverse plaiting circular knitting (terry knitting) process, e.g. as described in Knitting Technology, by David J. Spencer (Woodhead Publishing Limited, 2nd edition, 1996), the entire disclosure of which is incorporated herein by reference. Referring again to FIGS. 3 and 4, in the terry knitting process, the stitch yarn 22 forms the technical face 16 of the resulting fibrous fabric body and the loop yarn 25 forms the opposite technical back 14, where it is formed into loops (25, FIG. 11) extending over the stitch yarn 22. In the fibrous fabric body 12 formed by reverse plaiting circular knitting, the loop yarn 25 extends outwardly from the planes of both surfaces and, on the technical face 16, the loop yarn 25 covers the stitch yarn 22 (e.g., see FIG. 18). As a result, during napping of fibers at the opposite fabric surfaces to form a fleece, the loop yarn 25 protects the stitch yarn 22, including the conductive yarns 26 knitted into the fibrous fabric body in the stitch yarn position.

The loop yarn 25 forming the technical back 14 of the fibrous knit fabric body 12 can be made of any synthetic or natural material. The cross section and luster of the fibers or the filament may be varied, e.g., as dictated by requirements of the intended end use. The loop yarn can be a spun yarn made by any available spinning technique, or a filament yarn made by extrusion. The loop yarn denier is typically between 40 denier to 300 denier. A preferred loop yarn is a 200/100 denier T-653 Type flat polyester filament, e.g. as available commercially from E. I. duPont de Nemours and Company, Inc., of Wilmington, Del.

The stitch yarn 22 forming the technical face 16 of the fibrous knit fabric body 12 can be also made of any type of synthetic or natural material in a spun yarn or a filament yarn. The denier is typically between 50 denier to 150 denier. A preferred yarn is a 70/34-denier filament textured polyester, e.g. as available commercially from UNIFI, Inc., of Greensboro, N.C.

Figure 13:
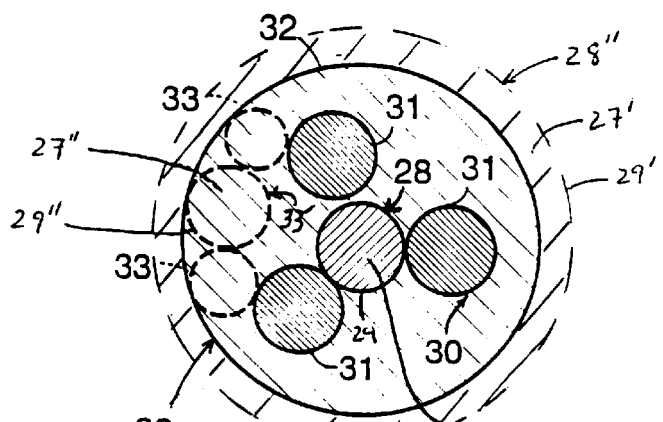

Referring now also to FIG. 13, and also to FIGS. 14–17, at predetermined, spaced, symmetrical or asymmetrical intervals during the knitting process, an electric resistance-heating member 18 in the form of a conductive yarn 26 is incorporated into the fabric body 12, e.g., in place of the stitch yarn 22. In one embodiment, the phase change component 17 (FIG. 1) is associated with heating member 18. Referring to FIG. 13, in a preferred embodiment, the conductive yarn 26 forming the electrical resistance heating elements 18 consists of a core 28 of phase change material 27 microencapsulated within an outer barrier layer 29, e.g. of resin, about which extends an electrical conductive element 30, e.g. three filaments 31 of stainless steel wire (e.g. 316L stainless steel) wrapped helically about the core 28, and an outer covering 32 of insulating material, e.g. polyester yarns 33 (only a few of which are suggested in the drawings) helically wrapped about the core 28 and the filaments 31 of the electrical conductive element 30.

Referring again to FIG. 13, in another embodiment, core 28 lacks phase change material 29 and is wholly of an insulating material, e.g. a polyester yarn, and has electrical conductive element 30, polyester yarns 33 and outer covering 32 as described immediately above. In this embodiment, phase change material 27' is provided as an outer layer 28" contained within barrier material 29' (as indicated by dashed lines) about conductive yarn 26. In one example, phase change material 27' and outer barrier 29' are applied to a conductive yarn 26 that is available, e.g., from Bekaert Fibre Technologies, Bekaert Corporation, of Marietta, Ga., as yarn series VN14.

In another embodiment (still referring to FIG. 13), core 28 is again wholly of an insulating material (i.e., lacking phase change material 27) and conductive yarn 26 does not have outer layer of phase change material 27'. Rather, in this embodiment, one or more of polyester yarns 33 is replaced with a strand 28'" (as also indicated by dashed lines in FIG. 13) of phase change material 27" microencapsulated by barrier layer 29".

In still another embodiment, conductive yarn 26 does not include a phase change material at all. Rather, strands 28'" of phase change material are separately incorporated into body 12 e.g., in place of stitch yarn 22 at predetermined, spaced, symmetrical or asymmetrical intervals during the knitting process to form fibers 19' of body 12 (as illustrated in FIGS. 2 and 4).

Figure 16:
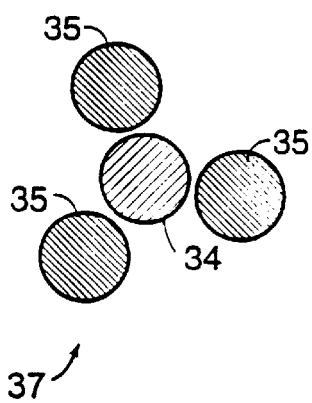
FIGS. 14–17 are similar views of alternative embodiments of conductive elements for fibrous electric heating/warming articles of the invention.
Figure 14:
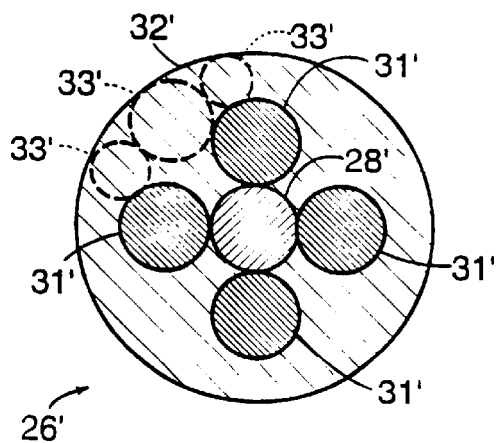
Figure 17:
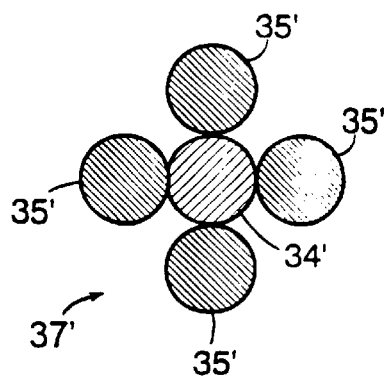
Figure 15:
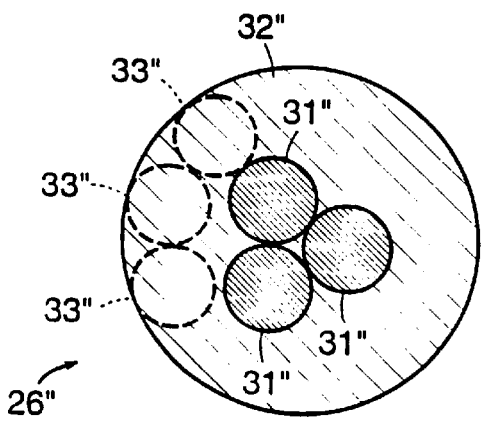

The number of conductive filaments in the conductive yarn, the positioning of the conductive filaments within the conductive yarn and the positioning and amount of phase change material associated with the conductive yarn or otherwise incorporated into the fabric body, are dependent, e.g., on end use requirements. For example, in alternative configurations, in FIG. 14, a conductive yarn 26' has four filaments 31' wrapped about core 28' with an outer covering 32' of polyester yarns 33'; in FIG. 15, a conductive yarn 26" has three filaments 31" wrapped by outer covering 32" of polyester yarns 33", without a core. Referring to FIGS. 16 and 17, in other embodiments, conductive yarns 37, 37', respectively, are formed without an outer covering about the filaments 35, 35', respectively, wrapped about core 34, 34', respectively. Instead, the stitch yarn 22 and loop yarn 25 of the fabric body 12 serve to insulate the conductive yarns in the fibrous heating/warming fabric article. Of course, incorporation of the phase change material 27, 27', 27" can be accomplished by any one or more of the techniques described above with reference to FIG. 13, i.e., by including one or more separate fibers that microencapsulate the phase change material or as a coating or outer layer on one or more existing fibers or on the entire conductive yarn 26, 26', 26", 37, 37'.

The resistivity of the conductive yarn can be selected in the range, e.g., of from about 0.1 ohm/cm to about 500 ohm/cm on the basis of end use requirements of the fibrous heating/warming fabric article 10. However, conductive yarns performing outside this range can also be employed, where required or desired. The core of the conductive yarn and the sheath material of the outer covering over the conductive filaments may be made of synthetic or natural material. The outer covering may also have the form of a sleeve, e.g. a dip-coated or extruded sleeve. Conductive yarns of different constructions that are suitable for modification to include a phase change material if desired can also be obtained from Bekaert Fibre Technologies.

As mentioned above, in a preferred method of the invention, the fibrous fabric body 12 is formed by reverse plaiting on a circular knitting machine. This is principally a terry knit, where the loops formed of the loop yarn 25 cover the stitch yarn 22 on the technical face 16 (see FIG. 18). The conductive yarn and/or separate fibers containing phase change material are incorporated into the fibrous knit fabric prebody formed on the circular knitting machine at a predetermined spacing or distance apart, D (FIG. 2), for uniform heating in the resulting heating/warming fabric article 10. In a fabric prebody of the invention, the spacing is typically a function, e.g., of the requirements of heating, energy consumption and heat distribution in the article to be formed. For example, the spacing of conductive yarns may be in the range of from about 0.02 inch to about 2.5 inches.

However, other spacing may be employed, depending on the conditions of intended or expected use, including the resistivity of the conductive yarns. In any event, where fibers of phase change material are separate from the conductive yarns, it is desirable to position the fibers relatively near the conductive yarns to ensure phase change occurs during operation of the article. The conductive yarns and/or separate fibers of phase change material may be spaced symmetrically from each other, or they may be spaced asymmetrically, with varying spacing, as desired.

Also as mentioned above, a preferred position of the conductive yarn and/or separate fibers of phase change material is in the stitch position of the circular knitted construction. Series of conductive yarns and/or separate fibers of phase change material may then be knit symmetrically, i.e., at a predetermined distance apart, in each repeat, i.e., the conductive yarn and/or separate fibers of phase change material can be in stitch position at any feed repeat of the circular knitting machine. Alternatively, or in addition, the feed position may be varied, and series of conductive yarns and/or separate fibers of phase change material may be knit asymmetrically, with the yarns more closely or widely spaced, e.g., as desired or as appropriate to the intended product use. Again, the specific number of feeds, and the spacing of the conductive yarns and/or separate fibers of phase change material, is dependent on the end use requirements. Also, in a fibrous fabric body of the invention, the power consumption for each conductive yarn is generally considerably lower than in the separate heating wires of prior art devices. As a result, the conductive yarns in a fibrous fabric body of the invention can be placed relatively more closely together, with less susceptibility to hot spots.

Figure 18:
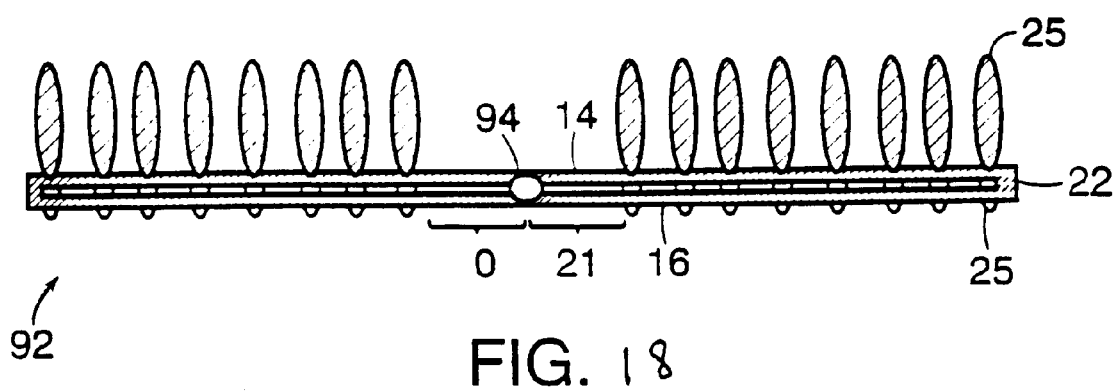
FIG. 18 is a somewhat diagrammatic section view of a segment of a tubular knit body during knitting.
Figure 19:
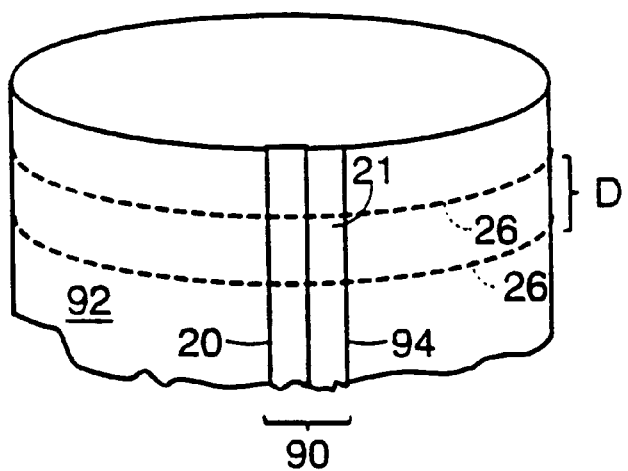
FIG. 19 is a somewhat diagrammatic perspective view of the tubular knit body of FIG. 18.

Referring to FIGS. 18 and 19, the edge regions 20, 21 may be formed as a panel 90 in the tubular knit body 92. The edge regions 20, 21 of the fibrous fabric body are preferably formed without loops, and in a manner such that the edge regions do not curl upon themselves, e.g. the edge region panel is formed by single lacoste or double lacoste knitting. The end portions 36 (FIG. 2) of the conductive yarns 26 extending into the flat, edge regions 20, 21 without loops are thus more easily accessible in the end regions for completing an electrical heating circuit, as described below.

The fibrous tubular knit body 92 is removed from the knitting machine and slit, e.g., along a line of stitches in a "needle-out" region 94 marking the desired slit line, to create a planar fabric. Alternatively, for increased accuracy, the fibrous tubular knit body 92 may be slit on-line, e.g. by a cutting edge mounted to the knitting machine.

Preferably, the fibrous knitted fabric body 12 incorporating the electric resistance heating elements 18 in the form of the conductive yarns is next subjected to finishing. During the finishing process, the fibrous fabric body 12 may go through processes of sanding, brushing, napping, etc., to generate a fleece 38. The fleece 38 may be formed in non-conductive fibers on one face of the fibrous fabric body 12 (FIG. 3), e.g., on the technical back 14, in the loop yarn, or a fleece 38, 38' may be formed in non-conductive fibers on both faces of the fibrous fabric body 12' (FIG. 20), including on the technical face 16, in the overlaying loops of the loop yarn and/or in the stitch yarn. In either case, the process of generating the fleece on the face or faces of fabric body is preferably performed in a manner to avoid damage to the conductive yarn that is part of the construction of the fibrous fabric body 12. In particular, the fleece is formed in a manner that avoids damage to both the conductive filaments and the phase change component of the conductive yarn and/or separate fibers of phase change material. Such damage to the conductive filaments would result in an increase in resistance to the point of creating an undesirable local hot spot, or would sever the conductive yarn completely, which could result in undesirable increased electrical flow elsewhere in the circuit. Also, such damage to the phase change component would result in leaking of the phase change material while in e.g., a fluid state. The fabric body may also be treated, e.g. chemically, to render the material hydrophobic or hydrophilic.

Figure 20:
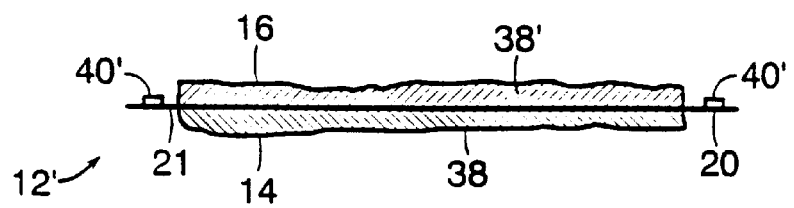
FIG. 20 is an end section view, similar to FIG. 3, of a fibrous electric heating/warming article with a phase change component of the invention with fleece on both faces.
Figure 21:
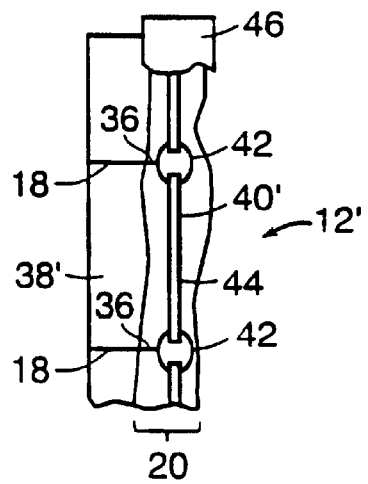
FIG. 21 is an enlarged, plan view of the technical face showing an alternative embodiment of a conductor element.

After finishing, and after the fibrous fabric body is heat set for width, conductive buses 40 are provided in opposite edge regions 20, 21 (where, preferably, there are no loops on the surface) to connect the spaced apart electrical resistance heating elements 18, in parallel, to a source of electrical power, thereby to complete the electrical circuit. The conductive buses 40 may be formed or attached upon the technical back 14, as shown in FIG. 2, or they may instead be formed or attached upon the technical face 16, as seen in FIGS. 20 and 21. Any suitable method may be used to complete the circuit. For example, referring to FIG. 2, the conductive bus 40 may, at least in part, be applied in the form of a conductive paste, e.g. such as available commercially from Loctite Corporation, of Rocky Hill, Conn. The conductive paste may be applied as a stripe to a surface of the fabric body 12 in electrical conductive relationship with the electrical resistance heating elements 18, and then connected to the power source. (If necessary, the conductive filaments of the electrical resistance heating elements 18 may be exposed, e.g., the polyester covering yarn may be removed with solvent or localized heat, e.g. by laser; the covering yarn may be manually unraveled; or the fabric body 12 may be formed with a needle out in the flat regions 20, 21, thus to facilitate accessibility to each of the conductive yarns.) More preferably, the conductive buses 40, in the form of conductive yarn or thread, are attached upon the surface of the fibrous fabric body 12, e.g., by stitching, e.g. embroidery stitching, sewing, or with an adhesive, such as by laminating. Alternatively, referring to FIG. 21, the conductive bus 40' may consist of localized dots or regions 42 of conductive paste applied in electrical contact with exposed conductive filaments of the electric resistance heating elements 18, with a conductive metal wire 44 disposed in electrical conductive contact with, and extending, preferably continuously, between, the localized conductive paste regions 42. The electric conductive bus 40' is thereafter covered by a layer of fabric material 46 joined to overlay a portion or substantially all of the surface of the fabric body 12', e.g., in the form of a cloth trim or edging material attached, e.g., by stitching along the edge of the fabric body 12', or in the form of a second layer of fabric joined to fabric body 12', e.g., by stitching or lamination.

The conductive bus 40 is preferably flexible, corrosion resistant, with low electrical resistivity, e.g. 0.1 ohm/meter to 100 ohm/meter, and mechanically durable. Other considerations include cost, availability in the market, and ease of fabrication.

The conductive bus 40 may thus have the form of a wire, e.g., stranded, twisted, or braided; a conductive-coated textile, e.g., a coated filament or fabric, or a woven ribbon; a foil tape, e.g., adhesive backed, with or without a conductive backing; a conductive-filled resin, e.g., disposed in a continuous line; or a hybrid textile, e.g., including tinsel wire or stainless steel filaments, in twisted, braided, stranded, woven or knitted configuration. The conductive bus 40 may also have the form of a single yarn, or two or more parallel yarns, woven or knitted into or stitched upon the fabric body, or a tape or band of conductive material attached upon the surface of the fabric.

In a presently preferred form, the conductive bus 40 may be a narrow woven element, incorporating silver-coated copper tinsel wire, either multi-strand or individual strands in parallel, with periodic floats provided for contact with the conductive yarns, or a narrow woven element pre-coated with conductive thermoplastic in a stripe pattern, with discontinuous diagonal stripes to provide flexibility and ensure registration with conductive yarns. The conductive bus 40 may also extend in multiple elements extending generally parallel in the edge region of the fabric, with similar or different lengths, to connect to distinct sets of conductive yarns, in this manner reducing the level of electrical current carried by each conductive bus element in the region close to the source of electrical power. In the case of conductive buses of different lengths, the resistivity of the individual conductive bus elements may be different.

The conductive bus 40 is preferably mounted upon the surface of the fabric body in a manner to provide strain relief. For example, strain relief attachment may be provided by sewing the conductive bus to the fabric, by tacking the conductive bus to the fabric body with mechanical fasteners, such as snaps, grommets, staples, or rivets; by over-molding in place strain relief injection-molded "buttons"; or by incorporating strain relief and electrical connection rigid filled resin having low viscosity. The conductive yarns 18 and conductive bus 40 may be connected electrically by conductive welding or paste; rivets, snaps, or metal holders or fasteners; interlacing, knitting or weaving in, or combinations of the above.

Figure 22:
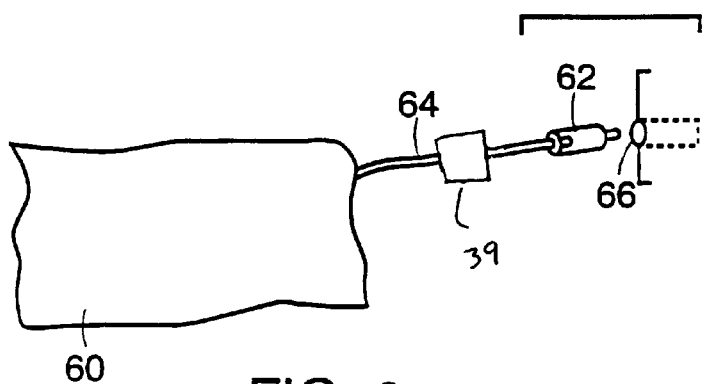
FIGS. 22, 23 and 24 are somewhat diagrammatic representations of other embodiments of fibrous heating/warming articles with a phase change component of the invention, as adapted to be powered by direct current, e.g., an automobile warming or heating pad (FIG. 22), adapted to be powered from an automobile battery; and a stadium or camping blanket (FIG. 23) and a garment (FIG. 24), adapted to be powered from a battery replaceably mounted to the article.
Figure 24:
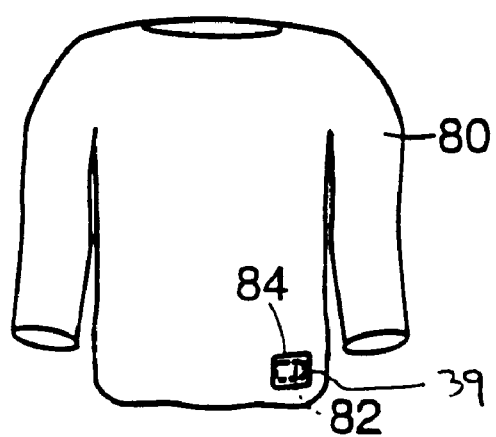
Figure 23:
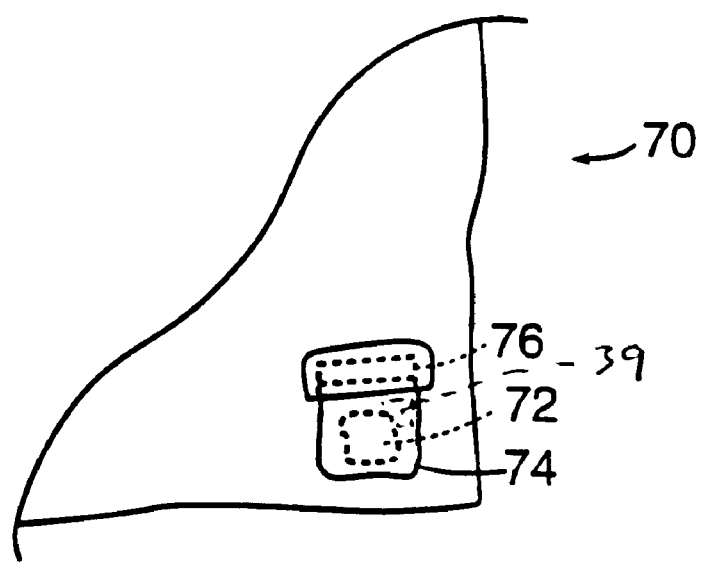

The completed circuit is next connected to a power source to supply electrical power to the electrical resistance heating elements for the required amount of heat generation. For example, referring to FIG. 2, a fibrous electric heating/warming fabric article 10 of the invention (an electric blanket) is adapted for connection to a source of alternating current by means of plug 50 on cord 51 for insertion in household outlet 52. Referring to FIG. 22, a fibrous warming or heating pad 60 of the invention, e.g. for an automobile seat, is adapted for connection to a source of direct current by means of plug 62 on cord 64 for insertion into the cigarette lighter or other power outlet 66 of an automobile. Referring to FIGS. 23 and 24, a fibrous stadium or camping blanket 70 and a fibrous garment 80 of the invention each includes a source of direct current, i.e. a battery pack 72, 82, respectively, e.g., as available from Polaroid Corporation, of Cambridge, Mass., replaceably mounted to the heating/warming fabric article, e.g. in a pocket 74, 84, respectively. Referring to FIG. 23, the pocket may be secured by a hook-and-loop type fastener 76. Preferably, for certification by Underwriters Laboratories Inc. (UL®), the voltage supplied by the power source to the electrical resistance heating elements is lower than 25 volts, e.g. a Class II UL® certified transformer may be used to step down a 110v power supply to 25 volts or under.

Each of article 10, pad 60, blanket 70 and fibrous garment 80 is also equipped with a controller 39 for intermittently providing power to the heating circuit. In one embodiment the control system includes an oscillator chip or other timing or cycling device for cycling application of electrical power from the power supply to the heating circuit, e.g., to extend battery life or to otherwise conserve electricity. The "on" portion of the timing cycle (i.e., when electrical power is being supplied to the heating circuit) can be set to allow the article 10, pad 60, blanket 70 or fibrous garment 80 to reach a temperature at which its associated phase change component changes phase, e.g., from a solid to a liquid. Thereafter, during the "off" portion of the cycle (i.e., when electrical power is not being supplied to the heating circuit), the article 10, pad 60, blanket 70 or fibrous garment 80 releases heat (e.g., by radiation, conduction, convection, etc.). The rate of heat loss, and thus cooling, is retarded (delayed) by the characteristics of the textile article, i.e. as in the manner of any prior art blanket or other textile article. However, in the textile article of the present invention, the rate of heat loss and cooling is further retarded by release of latent heat by the phase change material as it changes phase with cooling, i.e., from liquid back to solid.

Thereafter, again by operation of controller 39, e.g., a timer, after a predetermined period of time, or a thermostat, when a predetermined lower temperature is reached, or a manual control, operated by the user, application of electrical power is resumed. However, according to the invention, the period of time during which application of electrical power is not required is effectively extended by the presence of the phase change material. Thus the useful (effective) life of the battery is conserved and extended (or less AC electrical power is necessary to achieve a particular temperature output).

Figures 30, 31:
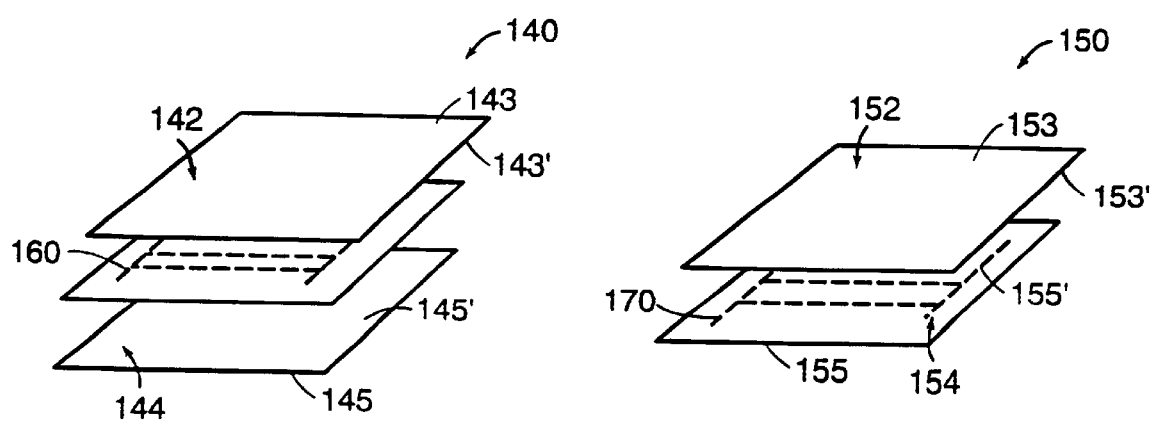
FIGS. 30 and 31 are somewhat diagrammatic perspective views of other embodiments of electric heating/warming articles with a phase change component of the invention formed of two or more layers.

Referring to FIGS. 30 and 31, in some embodiments, fibrous, multi-layer heating/warming fabric articles 140, 150 consist of at least two layers of fibrous fabric 142, 144 and 152, 154, respectively. Preferably, these layers of fibrous fabric have outer surfaces 143, 145 and 153, 155, respectively, fibers of one or both of which may be raised or fleece, and smooth (non-fleece), opposed inner surfaces 143', 145' and 153', 155', respectively, with a heating/warming circuit (represented by dashed lines 160, 170, respectively) disposed therebetween. A phase change component, such as component 19 or fibers 19' with phase change material described above with reference to FIGS. 2–4 and 13–17, is applied to or incorporated in one or more of the layers of articles 140, 150. In one preferred embodiment (FIG. 29), the heating/warming circuit 160 is associated, e.g., incorporated in, mounted upon, or otherwise joined to, a separate fibrous heating/warming fabric article 162, with which it is laminated, or otherwise disposed and secured, e.g., by stitching, between the outer layers of fabric 142, 144. In this embodiment, the fibrous heating/warming fabric article 162 may be formed as described above, e.g. with respect to FIG. 2, with the heating/warming circuit of spaced apart (symmetrical or asymmetrical) electrical resistance heating elements, e.g., in the form of conductive yarns, incorporated into the fibrous fabric article 162 and extending between conductive buses at opposite edge regions. Alternatively, the fibrous heating/warming fabric article 162 may be of a form having the heating/warming circuit 160 formed of conductive yarns disposed and secured upon the surface of the fibrous fabric article 162 and extending between conductive buses at opposite edge regions. For example, the conductive yarns with or without phase change material and/or separate fibers of phase change material may be fastened upon the surface, e.g., in embroidery stitches or sewing, by adhesive, or by mechanical locking as now to be described in greater detail.

Figure 32:
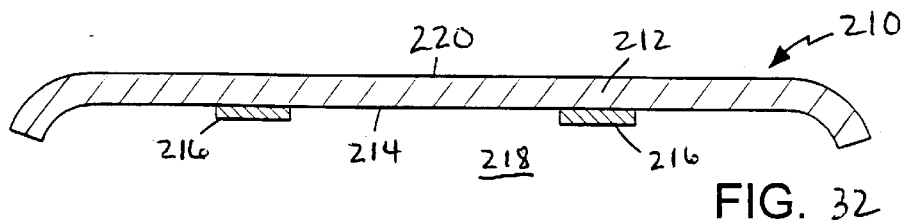
FIGS. 32 and 33 are somewhat diagrammatic side edge views of another embodiment of an electric resistance heating/warming composite fabric article with a phase change component constructed in accordance with the invention.
Figure 33:
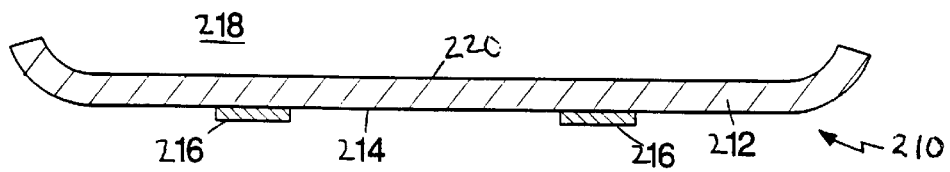
Figure 38:
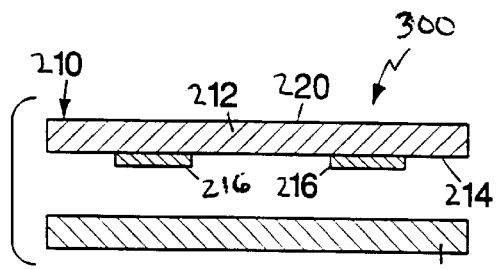
FIGS. 38, 39, 40 and 41 are somewhat diagrammatic side edge views of another embodiment of an electric resistance heating/warming composite fabric article constructed in accordance with the invention and including a barrier layer associated with the first surface of the fabric layer (FIG. 38) or associated with the opposite, second surface of the fabric layer (FIG. 39), or, alternatively, with a barrier layer attached upon the first surface of the fabric layer (FIG. 40) or attached upon the opposite, second surface of the fabric layer (FIG. 41).

Referring first to FIGS. 32 and 33, in one embodiment, an electric resistance heating/warming composite fabric article 210 constructed in accordance with the invention includes a fabric layer 212 and an electric resistance heating/warming element 216 formed upon a first surface 214 of the fabric layer 212, e.g., the first surface 214 being an inner surface of the fabric layer 212, relative to the region 218 to be heated/warmed (FIG. 32), or the first surface 214 being an opposite, outer surface of the fabric layer, relative to the region 218 to be heated/warmed (FIG. 33).

In preferred embodiments, the fabric layer 212 is made in any well known manner, e.g. the fabric layer 212 may be a knitted material, e.g., a plaited circular knitted or reverse plaited circular knitted material, or other circular knitted material (such as double knitted, single jersey knitted, two-end fleece knitted, three-end fleece knitted, terry knitted or double loop knitted material), or warp knitted or other weft knitted material, or a woven or non-woven material. In applications of the fabric article 210 having multiple layers, with the fabric layer 212 positioned outwardly, away from the wearer's skin, the material of the fabric layer is preferably hydrophobic, in order to resist penetration of liquids. In other applications of the fabric article 210 having multiple layers, with the fabric layer 212 positioned inwardly, toward the wearer's skin, the material of the fabric layer is preferably naturally hydrophilic, chemically rendered hydrophilic, or hydrophobic, in order to enhance removal and transport of perspiration away from the skin. In a preferred embodiment, the first surface 214 of fabric layer 212, to which the electrical resistance heating/warming element 216 is attached, is flat. The opposite, second surface 220 of fabric layer 212 may be flat or raised, e.g. by brushing, sanding or napping, and/or may be otherwise provided with decorative and functional features and finishes, e.g. as well known in the art. In another embodiment, the electric resistance heating/warming element 216 is incorporated in a double face, raised surface fabric. In both embodiments of the invention, the raised surface fabric, whether single face or double face, provides the advantage of insulating the conductive yarn so that more of the generated heat is available for warming the wearer. Also, the fibers of the raised surface fabric serve to isolate the conductive yarn from itself, thereby to reduce the possibility of short circuit. As mentioned above the phase change material can be separate strands (e.g., fibers 19' of FIG. 2) or can be associated with the conductive yarn (e.g., as described above with reference to FIGS. 13–17).

Figures 34, 34A:
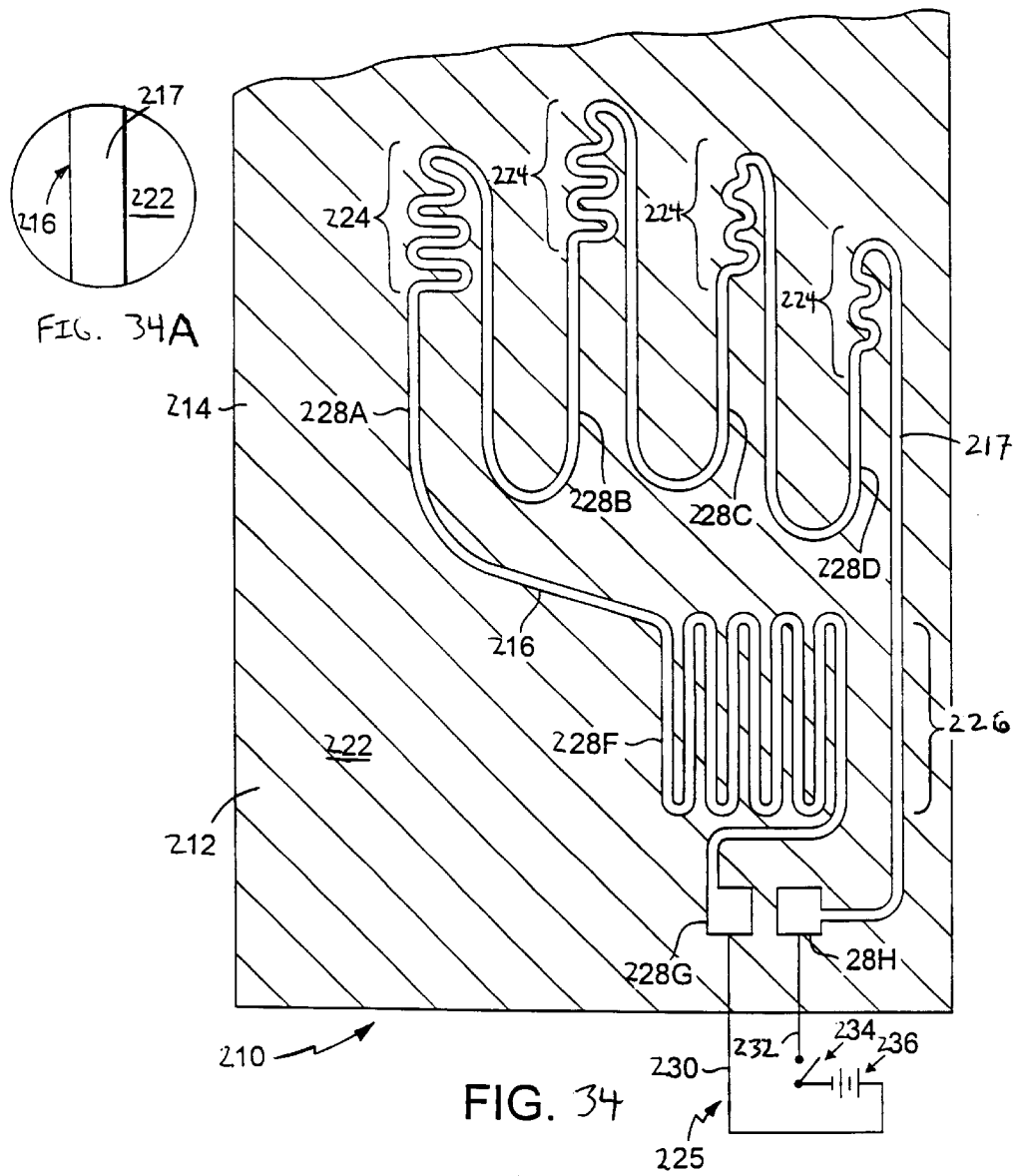

Referring also to FIG. 34, electric resistance heating/warming element 216 is disposed upon the first surface 214 of fabric layer 212. The electric resistance heating/warming element 216 is preferably formed of a conductive yarn 217 having sufficient electrical resistivity when fastened upon the surface of the fabric layer, e.g. in embroidery stitching or sewing (FIG. 34A), to generate a level of heat/warmth suitable for its intended purpose. For example, electrical resistivity of the conductive yarn in the range of 0.1 ohm/m to 500 ohm/m is considered suitable for use in most applications. However, conductive yarns performing outside this range can be employed, where required or desired. For example, any of the conductive yarn embodiments described above with reference to FIGS. 13–17, with or without incorporated phase change material can be employed.

Preferably, the conductive yarn 217 is applied upon the fabric layer first surface 214 in a predetermined pattern of embroidery stitching or sewing, to form an electric resistance heating/warming element 216 which is very flexible and can be bent and/or stretched without adversely affecting the electrical circuit. The fabric article 210, including the electric resistance heating/warming element 216 thereupon, is washable, and the heating/warming element 216 is non-swelling and hydrophobic. Preferably, the conductive yarn 217 is constructed to be resistant to stiffening and cracking upon exposure to low temperatures, e.g. such as those experienced in northern climes.

The predetermined embroidery stitching or sewing pattern of the electric resistance heating/warming element 216 may be custom designed for the particular use and purpose of the garment for which the composite fabric article 210 of the invention is to be used. For example, the pattern of the heating/warming element 216 of the composite fabric article 210 of FIG. 34 is designed for use in making a glove. For this purpose, the conductive yarn 217 of the electric heating/warming element 216 is embroidery stitched or sewn upon the first surface 214 of the fabric layer 212 to form a pattern having four elongated branches 228A, 228B, 228C, 228D (corresponding to fingers of a glove) and one or more labyrinth or zigzag sections 228F (corresponding to the palm or back of the body of a glove). The heating/warming element 216 is formed as a continuous circuit, terminating at 228G, 228H with free end portions of the conductive yarn 217 forming contacts 230, 232, respectively, which preferably are disposed adjacent to each other in a region convenient for connection to a source of power, e.g. for a glove, as shown, in a region to form the wrist of the glove. Still referring to FIG. 34, the electrical resistance heating/warming element 216 is connected by the free end/contact portions 230, 232 of the conductive yarn 217 in a circuit 225 including a switch 234 and a power supply, e.g., a battery pack 236. When switch 234 is closed, the heating/warming element 216 is activated to generate heat/warmth. (If necessary, the electrical conductive elements in the free end/contact portions 230, 232 of the conductive yarn 217 may be exposed, e.g., the polyester covering yarn may be removed with solvent or localized heat, e.g. by laser, or the covering yarn may be manually unraveled, thus to facilitate accessibility to the electrical conductive portions of the yarn.)

The pattern features of the electric resistance heating/warming element 216 shown in FIG. 34 are sized and shaped to conform to the regions of the resulting fabric article, i.e., the glove, so that the composite fabric can readily be cut to form one side of a glove. Patterns for use in other types and sizes of garments and fabric articles, e.g. such as socks, sweaters, jackets, shirts, pants, hats, gloves, footwear (e.g. shoes and boots) and so on, can be generated in a similar manner.

Figure 35:
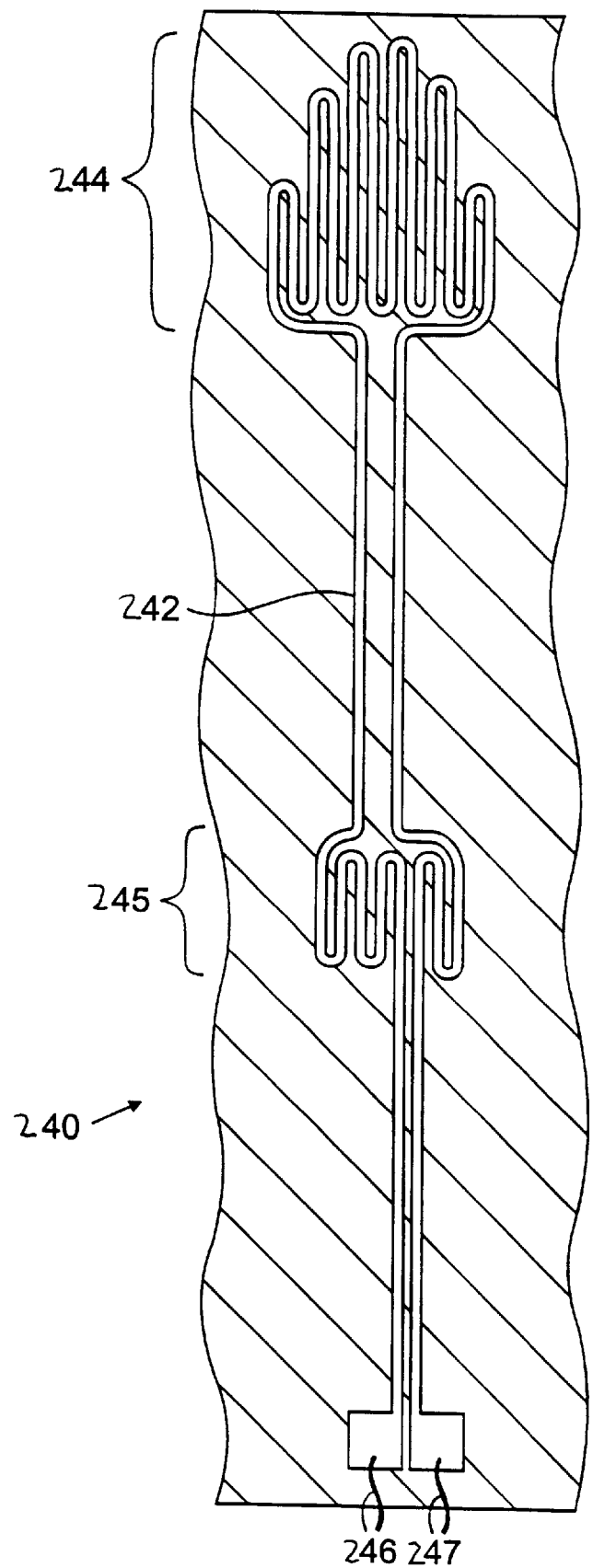
FIGS. 35 and 36 are somewhat diagrammatic front plan views of the first surfaces of composite fabric articles of FIG. 32, with electric resistance heating/warming elements formed thereupon, e.g., for an article of footwear (FIG. 35), and for a garment such as a shirt or jacket (FIG. 36)

For example, referring to FIG. 35, a composite fabric article 240 of the invention has a heating/warming element 242 sized and shaped to conform to the regions of the selected resulting fabric article, i.e., in this embodiment, a boot, to be heated/warmed so that the composite fabric can readily be cut to be formed and/or incorporated into a boot liner. In particular, the heating/warming element 242 has heating/warming regions 244, 245 of concentrated zigzag embroidery stitching upon the first surface 214 of the fabric layer 212, the regions 244, 245 corresponding to the toe/ball and heel surface regions, respectively, of a wearer's foot. The heating/warming element 242, which is formed as a continuous circuit, terminates with free end/contact portions 246, 247 of the conductive yarn, which are disposed adjacent to each other in a region convenient for connection to a source of power, e.g., as shown, in a region to extend into or above the ankle collar of the boot.

Figure 36:
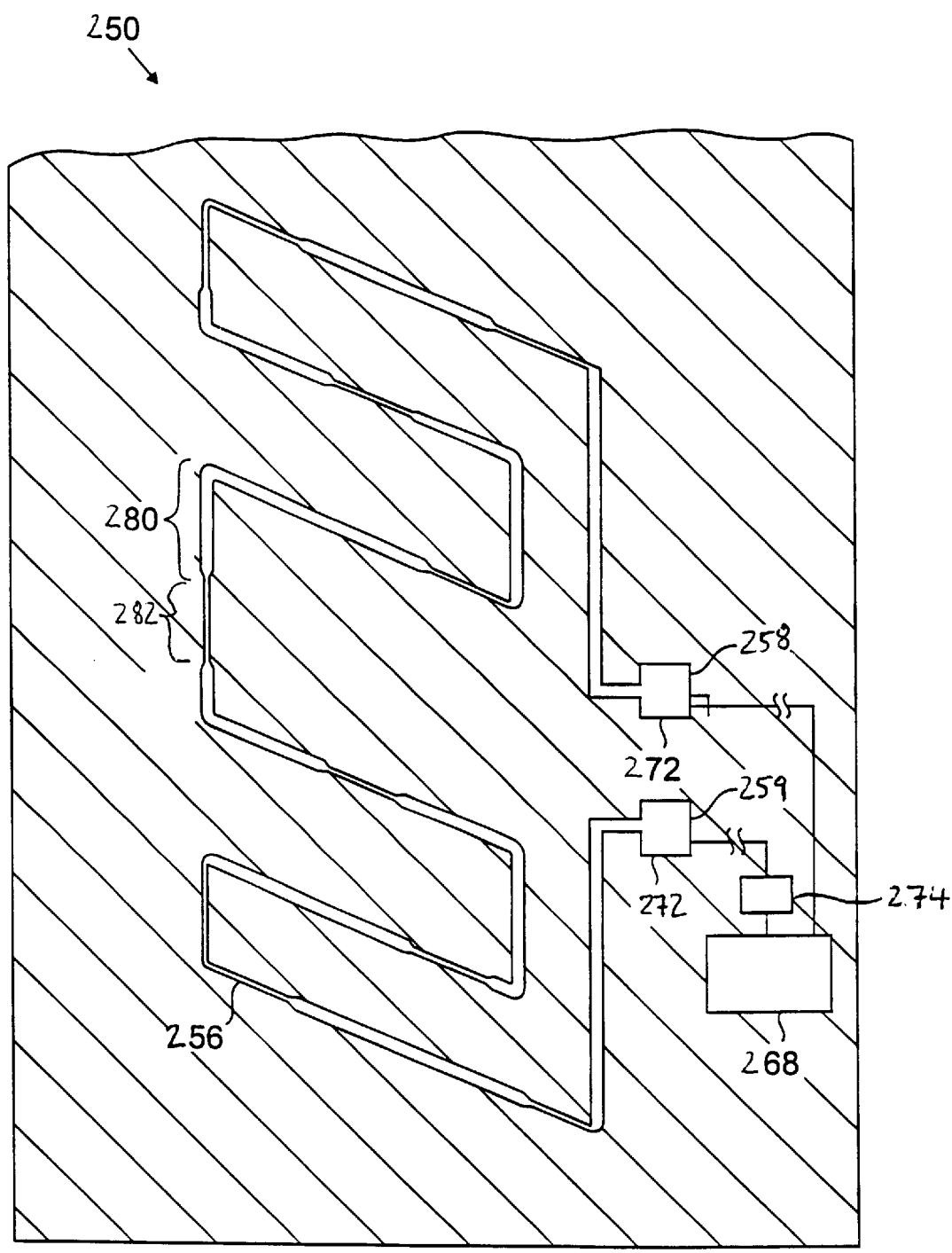

Referring to FIG. 36, a composite fabric article 250 of the invention has a heating/warming element 256 sized and shaped to conform to the regions of the selected resulting fabric article, i.e., in this embodiment, the opposite chest surfaces of a garment such as a shirt or a jacket 260 (FIG. 37), to be heated/warmed. The heating/warming element 256, which is formed as a continuous circuit, terminates at conductive yarn free end/contact portions 258, 259, respectively, which are disposed adjacent to each other in a region convenient for connection to a source of power, as discussed below.

Figure 37:
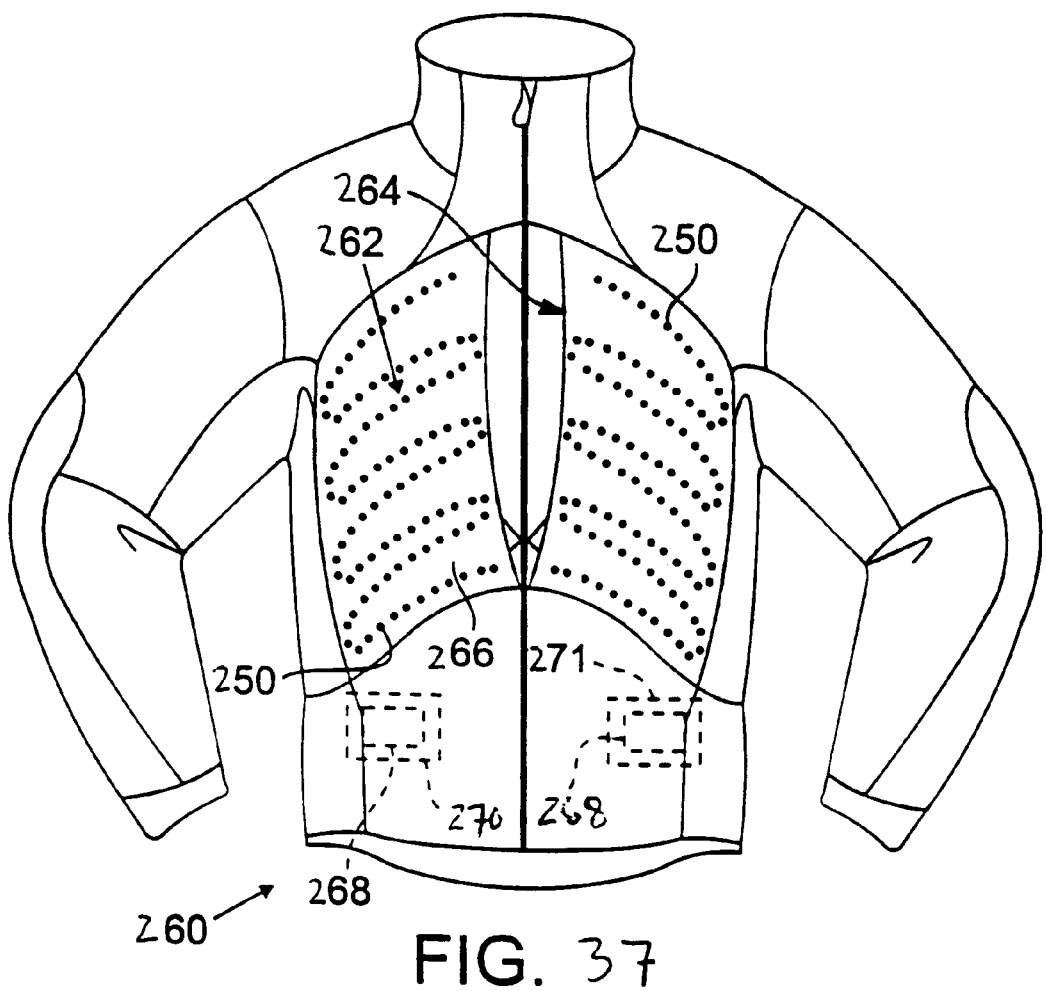
FIG. 37 is a somewhat diagrammatic front view of a garment, i.e., a jacket, incorporating the electric resistance heating/warming composite fabric article of FIG. 36.

Referring also to FIG. 37, a pair of fabric articles 250 are shown incorporated into jacket 260. A battery pack 268 for powering each of the heating/warming composite fabric articles 250 is contained in the associated zippered pockets 270, 271. The battery pack 268, e.g. as available from Polaroid Corporation, of Cambridge, Mass., is preferably removably connected to the free end/contact portions 258, 259 of heating/warming element 256, e.g. by releasable fastening elements 272, e.g. clips, snaps or other secure but releasable fastening elements. (The fastening elements may provide the electrical connection of the battery pack to the circuit, or, alternatively, may maintain the battery pack in position for contact of the battery pack with separate connectors.) This arrangement permits the battery pack 268 to be removed, e.g., whenever the fabric article 250 is to be washed, or for replacement. The heating/warming circuit 256 may also include an oscillator chip 274 or other timing or cycling device for cycling application of electrical power from the battery pack 268 to the heating/warming element 256, e.g., to extend battery pack life. For example, a timing cycle of three minutes "on" followed by one minute "off" is considered suitable for an electric heating/warming composite fabric article 250 incorporated as a chest panel of the heating/warm jacket 260 suited for outdoors use.

Figure 39:
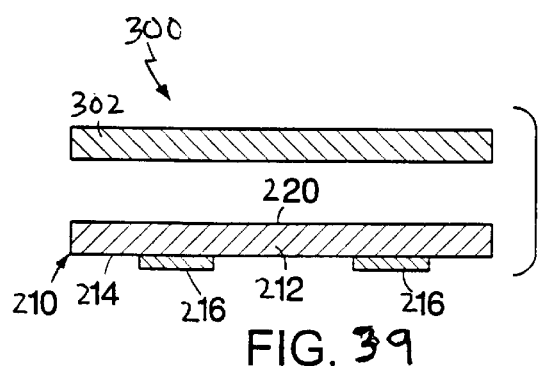
Figure 40:
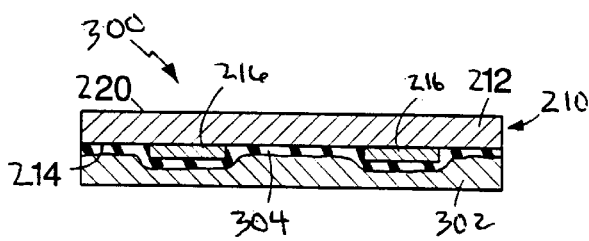
Figure 41:
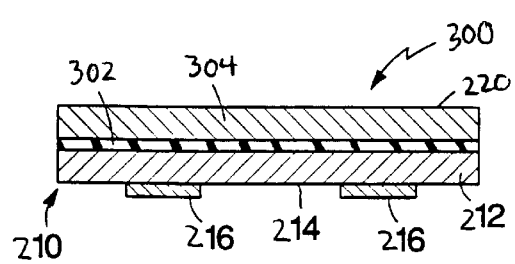

Referring now to FIGS. 38, 39, 40, and 41, the electric resistance heating/warming composite fabric article 210 of the invention may also be combined with a barrier layer 302 to form a stretchable, windproof, water-resistant, and vapor permeable electric resistance heating/warming composite fabric article 300 constructed in accordance with this invention. The barrier 302 is at least adjacent to a surface of the fabric layer 12. For example, the barrier layer 302 may be associated with a surface of the fabric layer 212 (FIGS. 38 and 39), or the barrier layer 302 may be attached upon a surface of the fabric layer 212, e.g., by lamination and/or with an adhesive 304 (FIGS. 40 and 41). The barrier layer 302 may be associated with the surface of the fabric layer 212 having the embroidery stitch or sewn circuit 216 formed thereupon, i.e. the first surface 214 (FIG. 38), or the barrier layer 302 may be attached upon the first surface 214, e.g., in FIG. 40, the barrier layer 302 is attached to the first surface 214 of the fabric layer 212, e.g. by lamination and/or with adhesive 304, overlying the circuit 216. Alternatively, the barrier layer 302 may be associated with or attached upon the second surface 220 of the fabric layer 212, opposite to the first surface 214 upon which the circuit 216 is formed by embroidery stitching (FIG. 39 and FIG. 41, respectively).

Preferably, the barrier layer 302 is formed of a vapor permeable membrane which is nonporous hydrophilic (e.g., polyurethane) or micro-porous hydrophobic (e.g., poly tetra fluoro ethylene (PTFE)) or a combination of both, e.g. in layers, as appropriate to the nature of the intended use, or as otherwise desired. In many embodiments, it is also preferred that the material of the barrier layer 302 be soft and stretchable. The barrier layer is constructed and/or formulated to resist air and water droplets from passing through the composite fabric article 300 while being permeable to water vapor. In applications where it is desired that the fabric article 300 is stretchable, the fabric layer 212 may typically be a knitted material, and a preferred material for barrier layer 302 is poly urethane, e.g. as available from UCB Chemical Corp. of Drogenbos, Belgium, either microporous hydrophobic (preferred for use where the barrier layer 302 is directed outward) or nonporous hydrophilic (preferred for use where the barrier layer 302 is directed inward, relative to the region 18 to be heated/warmed). Alternatively, in situations where relatively less stretch is required, e.g. in footwear, the fabric layer 212 may be a warp knitted material, and a preferred material for barrier layer 302 is poly tetra fluoro ethylene (PTFE), e.g., as available from Tetratec, of Feasterville, Pa.

Referring again to FIGS. 40 and 41, the barrier layer 302 is joined to the first surface 214 of fabric layer 212 by adhesive 304, typically applied in spots, lines or other discrete regions, or by attachment, lamination or other suitable manner of combining. A similar composite fabric (but having an additional internal fabric layer) is described in commonly assigned Lumb et al. U.S. Pat. No. 5,364,678, the entire disclosure of which is incorporated herein by reference.

A barrier layer 302 associated with (FIG. 38) or attached, e.g. by lamination or other techniques, upon (FIG. 40) the surface 214 of the fabric layer 212 upon which the embroidery stitched or sewn circuit 216 is formed serves also to protect the circuit against the effects of abrasion that might otherwise deteriorate the quality or continuity of the electrical heating circuit. In this embodiment, the barrier layer 302 may be formed of any suitable, protective material, e.g. a breathable plastic material, as described above, another layer of fabric, or the like.

A pair of fabric articles 300 may be incorporated into garment, e.g. a jacket 260, as shown in FIG. 37, where the outer coverings 262, 264 of the opposite chest surfaces of the jacket may be a shell material selected to provide a barrier layer overlaying the heating/warming composite fabric articles 300 incorporated into the jacket.

The relative amounts of heat/warmth generated by a region of an electrical resistance heating/warming element in a composite heating/warming fabric article of the invention can be controlled, e.g., by varying the effective volume density of the conductive yarn in a predetermined regions, i.e., by varying the size, bulk, thickness, tightness, density, and/or number of stitches, and/or by varying the conductivity/resistivity of the conductive yarn 217 forming the electrical resistance heating/warming element 216. For example, referring to FIG. 36, a heating/warming element 256 is formed of a conductive yarn of uniform conductivity applied by embroidery stitching or sewing to form regions 280 and 282 of contrasting width, and, therefore, contrasting effective density. As a result, in region 280 of relatively greater width, there is relatively more conductive yarn and thus relatively more generation of heat/warmth. Similarly, in region 282 of relatively lesser width, there is relatively less conductive yarn and thus relatively less generation of heat/warmth. As a result, a composite heating/warming fabric article 250 of the invention can be designed with a circuit element 256 that delivers relatively greater amounts of heat/warmth to selected regions of the wearer's body.

In other embodiments, this effect may also or instead be achieved by concentrating a relatively greater length of conductive yarn 217, e.g. in a tortuous, zigzag and/or interlocking spiral pattern, in a region of greater heat requirement. For example, referring to FIG. 35, a zigzag circuit pattern is provided in regions 244, 245 corresponding to toe/ball and heel surfaces, respectively, of a composite heating/warming fabric article 240 of the invention, i.e., a boot liner; and also, referring to FIG. 34, in the fingertip regions 224 and hand surface region 226 of a composite heating/warming fabric article 210 of the invention, i.e., a glove.

Alternatively, or in addition, an electric resistance heating/warming element of constant dimension but with regions generating relatively different levels of heat/warmth may be formed by forming circuit regions using yarns of inherently different conductivity, e.g. by varying the dimensions or nature of the conductive filaments 223. For example, in regions where relatively more heating is desired, e.g. thumb, fingertips, etc., a segment of yarn having relatively less conductivity (and therefore relatively more generation of heat) may be employed. Conversely, in regions where relatively less heating is desired, e.g. forefingers, etc., a segment of yarn having relatively more conductivity (and therefore relatively less generation of heat) may be employed. These and other methods for adjusting the conductivity of electrical circuit regions may be employed alone, or in any desired combination.

In the embodiments described immediately above, a fabric layer supports the electric resistance heating/warming layer, whether or not a barrier layer is provided. The fabric layer may be naturally hydrophilic, chemically rendered hydrophilic, or hydrophobic. In some embodiments, a barrier layer is provided at least adjacent to the inner surface of the fabric layer, i.e., attached to the fabric layer (with or without intervening materials) or spaced from attachment to or upon the fabric layer.

According to a presently preferred embodiment of articles and methods of the invention, apparel and home textiles generating heating/warming upon connection of a source of electrical power consist of a base fabric layer that is single face or double face, i.e. raised on one or both surfaces. (The base fabric layer may also be flat on both sides.) A protective and/or barrier layer of film, e.g. a breathable film, preferably hydrophobic porous, like poly tetra fluoro ethylene (PTFE), or non-porous hydrophilic, like polyurethane, or a layer of fabric, is attached, e.g. by lamination, upon a flat surface of the single face or flat base fabric layer. The heating/warming element is formed of a conductive yarn, typically having resistance between about 0.1 ohm/meter and about 500 ohm/meter, attached upon a surface of the base fabric by embroidery stitching or sewing. Alternatively, the conductive yarn may be laid in a pattern upon the smooth side of a single face or flat fabric and a secured by adhesive, mechanical locking, or by lamination of the protective and/or barrier layer of film, which provides protection for the conductive yarns, e.g. from abrasion, and/or resists through passage of air, for improved heating/warming performance. The conductive yarn has an advantage, e.g., over a printed circuit, in that it resists variation in conductivity and heating/warming performance, even after repeated folding of the base fabric layer.

In another embodiment (FIG. 31), the heating/warming circuit 170 may be incorporated into one layer (or both layers) of fibrous fabric 152, 154, or may be mounted upon an inner surface 153', 155' of one layer (or both layers) of fibrous fabric 152, 154, e.g., as described above with respect to FIG. 30.

The resulting product is a fibrous electric blanket, e.g., 90 inches by 90 inches with a 24-volt power supply, with features not available with blankets currently on the market. In a preferred embodiment, the fibrous blanket has the characteristics of being: flexible, foldable, portable, able to be washed frequently, comfortable, with zone heating and low voltage (for increased safety).

Various modifications may be made. For example, fibrous electric heating/warming articles of the invention may be formed by any suitable method that results in a fibrous body formed of non-conductive fibers, conductive elements capable of generating heating/warming when connected to a source of electrical power, and a phase change component attached to the fibrous body. The non-conductive fibers are exposed for finishing at one or both surfaces to create fleece, the finishing being performed in a manner to avoid damage to electrical conductivity performance of the conductive elements and/or the phase change component(s) joined with the non-conductive fibers in the fibrous body. The fibrous body may be formed, e.g., by knitting, weaving, tufting or needling, felting, laying up or otherwise forming a nonwoven web, or any other suitable process.

Referring now to FIGS. 24 and 25, for manufacture of fibrous electric heating/warming fabric articles of narrow width, relative to the width of the knitted web, a tubular knit body 100 may be formed as a continuous web, e.g., during knitting, with multiple, alternating machine-direction (arrow, M) panels or strips of regions with loops 102 bounded along each edge by regions without loops 104. The fibrous tubular knit body 100 can removed from the knitting machine and slit, in the direction of the continuous web, along each region without loops 104, e.g. along lines of "needle-out" regions 106 marking desired slit lines, or the fibrous tubular knit body 100 can also be slit on-line, to create multiple panels of planar fabric, each panel having a central region 108 with loops bounded by opposite edge regions 110, 112 without loops. Each of the narrow panels of fibrous fabric can then be processed to form relatively narrow fibrous electric heating/warming fabric articles of the invention, e.g. personal heating pads or the like, e.g., by severing in a direction generally transverse to the continuous web direction.

Also, other methods of constructing fibrous heating/warming fabric articles of the invention may be employed, e.g. the conductors may be incorporated by warp knit or weft knit construction or by woven construction. For example, referring to FIGS. 26 and 27, in fibrous woven electric heating/warming fabric articles 120, 120' of another embodiment of the invention, conductive bus 122, 122' may be in the position of a filling yarn or a warp yarn. The fibrous fabric body may be plush woven, i.e., formed as two sheets joined by interconnecting yarns or fibers. The sheets are then separated by cutting the interconnecting yarns, e.g., on-line, to provide two sheets, with the ends of the interconnecting yarns finished to provide each sheet with a plush surface. Alternatively, the fibrous fabric body may be flat woven of coarse yarn, which is then finished to form a raised (fleece) surface. The bus yarns may be comprised of one conductive yarn 124 (FIG. 26) with a resistivity of, e.g., 0.1 to 50 ohm per meter, or of multiple (i.e. two or more) conductive yarns 124' (FIG. 27), thus to ensure a more positive connection between the electric heating/warming elements 126 and the bus yarns 122.

Alternatively, referring to FIG. 28, in a fibrous weft or circular knit heating/warming fabric article 130 of another embodiment of the invention, the stitch yarns, including the conductive yarns 132, may include elastic yarn or fibers 134, e.g. such as spandex, e.g., with a core of elastic synthetic resin material wound with fibers of cotton, bare spandex, a spandex and yarn combination, or other suitable material, to provide a degree of elasticity or stretch. Fibrous electric heating/warming fabric articles 130 of this embodiment of the invention may have particular application for use in heating pads (where medically indicated) that can fit more closely upon irregular surfaces of a body part to be heated or warmed. The conductor element or bus may also include elastic yarn or fibers.

Referring to FIG. 29, the substrate 162 upon which the heating/warming circuit 160 is mounted or formed may be an open grid fabric, e.g., scrim, or a moisture resistant, vapor permeable and/or wind resistant barrier material. Referring to FIG. 30, the heating/warming circuit 170 may be incorporated between the fabric layers 152, 154 of a fibrous double knit fabric article 150, with the layers 152, 154 joined, in face-to-face relationship, by interconnecting yarns.

Fibrous heating/warming devices of the invention may also be employed for delivering therapeutic heat to a selected region of the human body. For example, for delivering therapeutic heat upon a relatively large surface region, e.g., of the back or thigh, the heating/warming device may be in the form of a wrap or sleeve, with the heating/warming circuit having the form of a parallel circuit. For delivery of heating/warming to a more local region, a heating/warming device consisting of woven layers may be in a form suitable for mounting to strap or a brace with a heating/warming circuit having the form of a series circuit.

Referring again to FIG. 1, the electrical resistance heating/warming elements 15 of the textile article 11 are powered, e.g., by an external source of electrical power, which may be alternating current (AC), but which more typically is direct current (DC), e.g. from a battery 23 mounted to the fabric article 11.

Upon application of electrical power to the electrical resistance heating warming elements, heat is generated to increase the temperature within a region of the textile article, including, e.g., the user disposed therewithin. During this "ON" period of heat generation and warming, the phase change material incorporated into the textile article is also caused to change phase, e.g. from solid to liquid, by application of the heat. Thereafter, by operation of a controller 24, e.g. a timer, after a predetermined period of time, or a thermostat, when a desired temperature is achieved, or a manual control, operated by the user, application of electrical power is discontinued, thus to conserve energy (of the battery). During this "OFF" period, heat is released (e.g., lost by radiation, conduction, convection, etc.) from the region of the textile article. The rate of heat loss, and thus cooling, is retarded (delayed) by the characteristics of the textile article, i.e. as in the manner of any prior art blanket or other textile article. However, in the textile article of the present invention, the rate of heat loss and cooling is further retarded by release of latent heat by the phase change material as it changes phase with cooling, i.e., from liquid back to solid.

Thereafter, again by operation of controller 24, e.g., a timer, after a predetermined period of time, or a thermostat, when a predetermined lower temperature is reached, or a manual control, operated by the user, application of electrical power is resumed. However, according to the invention, the period of time during which application of electrical power is not required is effectively extended by the presence of the phase change material. Thus the useful (effective) life of the battery is conserved and extended.

Preferably, the application of electrical resistance heating is synchronized to oscillate (between time "ON" and time "OFF") with the change of phase of the phase change material. This approach utilizes the phase change technology to its maximum capability, and at the same time saves energy (battery life) and extends the useful life of the battery as a power source.

A number of embodiments of the invention have been described. Nevertheless, it will be understood that various modifications may be made without departing from the spirit and scope of the invention. For example, the textile article may be heated by other than electrical resistance heating, e.g. by flow of fluid. Accordingly, other embodiments are within the scope of the invention.

What is claimed is:

1. A heating/warming textile article comprising:

a fabric body;

an electrical resistance element attached to the fabric body, the electrical resistance element capable of being electrically coupled to and uncoupled from an electrical power source to cyclically provide electrical power to the electrical resistance element for providing heating/warming of the textile article; and a phase change component associated with the fabric body and including a phase change material formulated to change phase in a temperature range of use of the textile article, to cyclically absorb and release latent heat in a manner capable of conserving use of the electrical power source;

wherein the phase change component includes a phase change fiber that microencapsulates the phase change material.

2. The heating/warming textile article of claim 1, wherein said phase change fiber at least partially forms the fabric body.

3. The heating/warming textile article of claim 1, wherein said phase change fiber is incorporated into the fabric body.

4. The heating/warming textile article of claim 1, wherein said phase change fiber is attached to the fabric body by at least one of knitting, weaving, stitching, embroidery stitching, laminating and applying an adhesive.

5. The heating/warming textile article of claim 1, wherein the phase change component comprises a coating of phase change material on fibers of the fabric body.

6. The heating/warming textile article of claim 1, wherein the electrical resistance element comprises a conductive yarn and the phase change component comprises a coating on the conductive yarns.

7. The heating/warming textile article of claim 1, wherein the electrical resistance element comprises a conductive yarn and said phase change fiber is stranded together with said conductive yarn.

8. The heating/warming textile article of claim 1, wherein said temperature range of use of the textile article is about 32° F. to about 120° F.

9. The heating/warming textile article of claim 1, wherein said phase change material comprises at least one of paraffin and glycol.

10. The heating/warming textile article of claim 1, wherein said power supply is a battery.

11. The heating/warming textile article of claim 1, further comprising a controller for controlling the electrical power supplied from the power supply the electrical resistance element.

12. The heating/warming textile article of claim 11, wherein the controller comprises a timer.

13. The heating/warming textile article of claim 11, wherein the controller comprises a thermostat.

* * * * *